United States Patent Office 2,835,592
Patented May 20, 1958

2,835,592
FLAVOR

Irving I. Rusoff, Newark, N. J., assignor to General Foods Corporation, White Plains, N. Y., a corporation of Delaware No Drawing. Application April 26, 1957
Serial No. 655,200
51 Claims. (Cl. 99—140)

This invention relates to artificial chocolate flavor and to a process for making the same. More particularly, the invention is concerned with an artificial chocolate flavor component which may be used as a base flavor factor in combination with other flavor factors such as astringency, bitterness, and the like, or which may be used alone and without such other factors to enhance the flavor of natural chocolate products. This application combines the subject matter of my co-pending application Serial No. 453,413, filed August 31, 1954, and Serial No. 512,887, filed June 2, 1955, and is thus a continuation-in-part of each of said co-pending applications.

Flavor derived from cacao for manufacture of chocolate and cocoa products involves numerous widely separated and distinct steps commencing at the plantations in tropical environs and continuing until incorporation of the flavor in a finished product which can be a confectionery, beverage, or like food product. From the time cacao seeds are removed from their pods and are subjected to well-known processes which include fermentation, drying, grading, etc., obscure chemical reactions take place that condition the beans for roasting, during which the characteristic flavor of chocolate is developed. While progress has been made in the art of developing natural chocolate flavor, the processes involved require a high degree of control and are widely separated, the flavor varies with the source of the cacao, and the cost is excessive.

The invention has for its primary object the elimination of reliance on cacao as the sole source of chocolate flavor by development of such flavor from a wide variety of other raw materials.

It has been discovered that partially hydrolyzed proteins can be reacted with reducing sugars and precursors thereof to provide an imitation or artificial chocolate flavor component which may be used as the base flavor factor. By "base flavor factor" is meant a flavor component which may be used in combination with bitterness, astringency and other flavor factors to provide an imitation or artificial chocolate flavor. The base flavor factor may also be employed to enhance the flavor of natural chocolate products. The base flavor factor provides fullness and body which levels out and prolongs the taste sensation.

The reaction to develop the above-described base flavor factor is carried out by the application of heat to a mixture of the reagents at a temperature and for a time sufficient to produce the base flavor factor in a substantially anhydrous condition at least at the end of the reaction. The reaction is carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide, the time for such reaction varying inversely with temperature. Any one of a number of well-known apparatus may be employed to carry out the reaction such as a spray drier, a pan roaster, a drum drier, and the like. The reaction which results in the production of the base flavor component appears to be accompanied by a substantial decrease in the measurable amino nitrogen and reducing sugars in the reaction mixture.

The protein degradation technique employed herein to produce the partially hydrolyzed protein may be enzymatic, acidic, or alkaline, although it is preferred for the purpose of the present process that enzymatic or acidic hydrolysis be utilized. Of these protein hydrolysis methods that which is most preferred is the one employing enzymes. Such enzymes include the proteolytic enzymes such as trypsin, rennin, pepsin, erepsin, papain, bromolin, and the like. The use of alkaline degradation of the protein frequently results in the development of undesirable off-flavors in the final product, the artificial base flavor factor. Both alkaline and acid degradation are more difficult to control as compared with the enzyme degradation, require expensive, corrosion-proof equipment and, moreover, in some cases destroy certain amino acids which as set forth hereinafter are desired from the standpoint of obtaining best results. The degree of hydrolysis or proteolysis required in the present invention is substantially between 8% and 70%, viz., 8–70% of the total nitrogen in the hydrolyzate is amino nitrogen. Generally, it has been found that as the degree of proteolysis increases, the flavor intensity of the base flavor factor also increases.

It is believed that the degree of protein hydrolysis employed as described above is such that the peptides in the protein hydrolyzates are di-, tri-, and the somewhat more complex peptides which can best be described as "oligopeptides." The term "oligopeptides" is employed herein to denote di-, tri-, and up to penta- and hexapeptides. It has been found that substantially unhydrolyzed proteins on the one hand and amino acids on the other hand are incapable of reaction with the reducing sugars to provide the base flavor factor and that partially hydrolyzed protein is essential to provide said factor; best results are obtained with oligopeptides. However, some amino acids such as alpha-amino-n-butyric acid, histidine, alanine, arginine, aspartic acid, glycine, glutamic acid, valine, phenylalanine, proline, lysine, iso-leucine, leucine, threonine, tyresine, and tryptophane, when present at the time of reacting the oligopeptides with the reducing sugars result in a considerably enhanced base flavor factor. Of these amino acids, phenylalanine and threonine are particularly preferred.

Among the proteins that may be partially hydrolyzed and reacted with reducing sugars in accordance with the present invention are vegetable and/or cereal grain proteins such as those obtained from wheat, corn, hemp, soy, rye, oats, peanut, barley; animal and fish proteins such milk protein, e. g., casein and lactalbumin, egg albumin, serum albumin, fish albumin, gelatin, elastin, collagen, keratin, and the like.

The more preferred animal protein source is cows' milk, and the more preferred vegetable protein source is soybeans. The most preferred protein source is skim milk, although whole milk and other milk products can be employed. Advantageously, both whole and skim milk include abundant quantities of lactose, a reducing sugar, so that the base flavor factor can be obtained from a single raw material by degrading the milk protein and then reacting the same at an elevated temperature with the lactose. Furthermore, in the case of whole milk, a lipolytic as well as a proteolytic enzyme can be employed to hydrolyze the fat into fatty acids to provide a butyryl character to the base flavor factor.

The above-specified operable range of partial hydrolysis for proteins, viz., 8–70%, is an expression of the percent hydrolysis within which all of the proteins tested have been found to yield the base flavor factor under the reaction conditions of the present invention. Significantly, however, different proteins yield optimal flavor at different degrees of hydrolysis. This apparently is due to the variety of complex molecular structures of the various proteins which can be degraded. With respect to such chemical structures of proteins, it has been found that as the type of hydrolysis, whether enzymatic, acidic, or alkaline, and the percent hydrolysis of the various proteins as expressed hereinabove are varied, there will be provided various flavor levels. Thus, soy albumin when hydrolyzed 8–70% may be reacted in accordance with the present invention to provide a highly satisfactory base flavor factor with optimum results being obtained at about 10–45% hydrolysis. In the case of wheat gluten, good results are obtained over the same wide range of percent hydrolysis of the protein, the better base flavor factor in said range being obtained at 10–50% hydrolysis and optimal results being obtained at about 40% hydrolysis. In the case of cod protein, best base flavor factor is obtained at 40–60% hydrolysis. With casein excellent flavors are obtained in the wide range of 10–55% hydrolysis. In the case of gelatin, excellent base flavor factor is obtained over the wide range of 8–70% hydrolysis with no particular optimum range of hydrolysis being apparent. Hemp, rye, or cottonseed protein provide the best base flavor factor at 40–60% hydrolysis. Partial degradation of reconstituted skim and whole milk from 8–55% hydrolysis results in increased flavor levels as proteolysis increases; however, prolonged digestion periods and relatively high levels of enzyme, e. g., trypsin, are required to achieve over 20% hydrolysis, and since base flavor of adequate strength is produced at the lower levels of 8–20% hydrolysis and this degree of hydrolysis is obtained in a relatively short period, this latter narrower range is preferred from a practical operating standpoint. Enzyme degradation of lactalbumin to about 45–65% hydrolysis results in optimum base flavor development, while in the case of egg albumen optimum results are obtained at the level of 8–25% enzymatic hydrolysis. In the case of bovine albumin, enzymatic hydrolysis at 20% to 55% results in very good base flavor.

As indicated herein, percent hydrolysis is intended to mean the percent of total nitrogen which is amino nitrogen, the former being determined by the Kjeldahl method and the latter being determined by the formol method.

In the work described herein, amino nitrogen was determined by the method described in David M. Greenberg's "Amino Acids and Proteins," Charles C. Thomas, Springfield, Illinois (1951) on pages 80, 81 and 246. Another formol titration method is that developed by Sorenson and described in the "Official Methods of Analysis of the Association of Official Agricultural Chemists," 7th ed., A. O. A. C., Washington, D. C. (1950), on page 365. Generally, in the case of pure proteins, formol nitrogen determination by the Greenberg method can be converted to Sorenson values by multiplying the Greenberg values by the factor 0.56. With proteins in a highly buffered system such as cows' milk, this conversion factor cannot be employed because values provided by the two different methods of analysis do not differ proportionately as they do with pure protein.

The protein hydrolyzate may be reacted with any suitable reducing saccharide, that is, a saccharide capable of reducing Fehling's solution to give cuprous oxide, or with any suitable precursor thereof, which expression includes all saccharides and other materials that provide a reducing saccharide or saccharides under the conditions of the reaction. These precursor materials consist mainly of those di- and poly-saccharides which undergo molecular cleavage to yield reducing saccharides, such as the disaccharide, sucrose; the trisaccharide, raffinose; the polysaccharide material, dextrin, which of itself comprises both reducing saccharides and precursors thereof; etc. The reducing saccharides include all monosaccharides, disaccharides of the gentiobiose type, the trisaccharide manninotriose, etc. In addition, certain saccharic materials can be used which are derived from or closely related to the monosaccharides and have similar reducing properties, such as the "-uronic" acid, galacturonic acid; the desoxy sugar, rhamnose; and the pentaacetate of galactose. Thus the term "reducing saccharide" as used in the claims will be understood to include all of the reducing saccharide and saccharic compounds and precursors which provide reducing saccharide or saccharic compounds under the conditions of the reaction by degradation of the molecule or in any other manner.

Generally, the reducing sugar and the protein hydrolyzate may be reacted in widely varying proportions by weight. The amount of reducing sugar may range, for example, from 5–150% by weight of the protein hydrolyzate and excellent results will be obtained. The latter percentage approximates the ratio of lactose to protein in skim milk which can be hydrolyzed proteolytically and reacted to provide the base flavor factor. In the case of monosaccharides like glucose, base flavor factor is obtained in the range of 5–20% glucose by weight of casein hydrolyzed to 50%, optimum flavor being derived at levels of glucose between 5–15%.

The temperature and time of reaction depend on the nature of the reactants, particularly the saccharide. For example, the greater reactivity of the monosaccharides make possible the use of lower temperatures without requiring excessive heating periods, whereas, in the case of less reactive disaccharides it is desirable to employ higher temperatures.

The useful saccharide materials can be divided into the following groups according to the preferred temperature ranges of the reaction, although it will be understood that the stated limits of these preferred ranges are not necessarily the minimum or maximum temperatures at which some useful results can be secured.

(1) The pentoses, including aldopentoses, methyl pentoses, ketopentoses, etc. Examples are xylose, arabinose and rhamnose. For this group, the preferred temperature range of the reaction is from 90° C. to about 130° C.

(2) The hexoses and reducing polysaccharides. In common with the pentoses of group 1, these reducing saccharides of group 2 have reactive aldehyde or ketone groups which are free to participate directly in the reaction with the protein hydrolyzates, but are less reactive than the pentoses so that the preferred temperature range for the reaction is approximately from 120° C. to 150° C. Examples are the aldohexoses such as glucose, galactose and mannose; the ketohexoses such as levulose and sorbose; reducing disaccharides such as lactose and maltose and other disaccharides of the gentiobiose type; the reducing trisaccharide manninotriose; etc. With this group may also be classified saccharide mixtures such as corn syrup and malt syrup which contain both dextrose and maltose, and invert sugar which contains dextrose and levulose. In addition such saccharic materials as galacturonic acid and the pentaacetate of galactose can be used in this temperature range.

(3) Non-reducing polysaccharides which are precursors of reducing saccharides, as explained above. In this group, the temperature must be high enough in the first place to cause the formation of the reducing saccharide, and the preferred temperature range is approximately 140° C. to 170° C. Examples are the polysaccharides sucrose, dextrin and raffinose.

As indicated above, the reagents are heated at a temperature and for a time sufficient to create a substantially anhydrous condition at least at the end of the reaction. It appears that the properly mixed reactants require removal of sufficient quantities of water to provide a substantially anhydrous somewhat molten mixture for roasting to develop the artificial chocolate flavor of the present invention. However, the term "substantially anhydrous" is not meant to exclude the presence of some water in solution. In fact, a small amount of water is formed continuously during the course of the reaction, which fact alone is sufficient to preclude a completely anhydrous molten state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures cannot be determined definitely, however, and in practice it is satisfactory to observe the rule that the product upon cooling to room temperature is substantially solid and substantially dry to the touch. The term "substantially anhydrous" is to be understood to include the presence of moisture within this limitation.

As aforementioned, the base flavor factor of the present invention can be combined with various other flavor factors of chocolate such as bitterness, astringency, aroma, and like factors in the preparation of an artificial chocolate flavor. The bitterness, astringency, aroma, and like factors, whether employed alone or in combination, fail to provide an artificial chocolate flavor but when one or more of these factors is combined with the base flavor factor of the present invention the taste sensation is leveled off and prolonged because of the fullness and body provided by the base flavor factor. The base flavor factor can be regarded as a background against which the more distinctive flavor factors such as bitterness, astringency, aroma and the like can be better appreciated.

Bitterness may be provided by the addition of bitter alkaloids such as caffein, theobromine, quinine, and the like. Other bitterness flavor factors that may be employed are the bitter polyacetates of polyhydric compounds such as the monosaccharides, glucose and levulose; the disaccharides, sucrose, lactose and maltose; the polyhydric alcohols, such as sorbitol and mannitol. Included in this class of bitterness factors are sucrose octaacetates, glucose triacetate, glucose tetraacetate, glucose pentaacetate, levulose triacetate, levulose tetraacetate, levulose pentaacetate, maltose octaacetate, sorbitol hexaacetate. Generally, the beta isomer of the polyacetates is much more bitter than the alpha isomer. Another class of bitterness flavor factors which may be employed are the bitter glucosides, such as quassin, naringin, the alpha-phenol-glucoside, beta-phenol-glucoside, 2,3,5,6-tetra - acetyl - alpha - phenol - glucoside, 2,3,5,6 - tetra-acetyl - beta - phenol - glucoside, 2,3,5,6 - tetra- - acetyl-alpha-methyl-glucoside, 2,3,5,6-tetra-acetyl-beta-methyl-glucoside. Still another group of bitterness flavor factors are the bitter acetonylated sugars such as diacetone-glucose, 3-acetyl-diacetone-glucose, 3 -acetyl-monoacetone-glucose. 3 - benzoyl - diacetone - glucose, and 6 - benzoyl-monoacetone-glucose. Still another class of bitter flavor factors are salts and esters of inorganic acids such as dulcitol pentanitrate, potassium sulfate, iso-amyl potassium sulfate, methyl-hexylcarbinol potassium sulfate.

Astringency may be provided by employing various tannins or tannates obtained by infusion or evaporation from wood, leaves or fruit of plants, e. g., extracts of the heartwood of acacias such as *Acacia catechu* and *Acacia catechu sundra* which are broadly referred to in the trade as "cutch," and the galls of oak, sumac, etc. Such astringency factors are generally water-soluble and include catechin having the formula $C_{15}H_{14}O_6$. Included in this class of compounds are dl-catechol, d-catechol and d-epicatechol. Among some of the useful commercially available astringency factors are various powdered products such as cocoa tannins, catechu gum, gambir gum, rhatany root, eyebright herb, white oak bark, witch hazel bark, quebracho wood extract, chestnut leaves, red oak bark, black kino gum and gum myrrh. Other astringent materials include the alums such as sodium, potassium, ammonium, and like alums.

Chocolate aroma materials that can be employed in combination with the base flavor factor of the present invention, preferably along with the bitterness and astringency flavor factors described above, include aromatic materials derived from chocolate liquor, cocoa beans, cocoa powder by distillation, solvent extraction, and the like. In order to have a completely artificial chocolate flavor, however, one may employ a mixture of oil of coriander, vanillin, ethyl vanillin, oil of nutmeg, cinnamon and other essential oils which provide an aromatic principle similar to that of natural chocolate.

The base flavor factor resulting from the process of the invention is usually a powdery, friable material which is soluble in aqueous medium such as water, milk, and the like. The product is capable of incorporation into a number of food products, either as the base flavor factor in an artificial chocolate flavor or to enhance the flavor of natural chocolate. The base flavor factor of the present invention alone or with other flavor factors of chocolate can be included in a wide variety of confectionery products such as chocolate bars, candy coatings, cocoa powders for milk drinks and baked goods. Advantageously, the product may be combined with fats such as cocoa butter or with other fats and oils.

The following examples illustrate embodiments of the invention, but it is to be understood that these examples are for purposes of illustration and that the invention is not limited thereto, since various changes can be made by those skilled in the art without departing from its scope and spirit.

*Example 1*

The following compositions wer thoroughly mixed in a 50 cc. beaker:

| Reaction ingredients: | Percent composition |
|---|---|
| Casein hydrolyzate (53% hydrolysis) (enzymatic) | 45.0 |
| Tannins | 25.8 |
| Arabinose | 3.3 |
| Glucose | 3.3 |
| Fructose | 3.3 |
| Theobromine | 13.0 |
| Caffein | 6.5 |

To the above mixture of ingredients 30% water was added until a pasty consistency was obtained. The mixture was then heated for 8 minutes at approximately 130° C. in an oil bath and yielded a dark brown, water-soluble, friable substantially anhydrous mass. 0.5 gm. of the powdered product was dissolved in 100 ml. of whole milk containing 5 gms. of sucrose to provide a chocolate flavored milk drink. Alternatively, the casein hydrolyzate and the reducing sugars arabinose, glucose and fructose may be reacted in the oil bath to provide the base flavor factor, the tannins, theobromine and the caffein being added after the reaction to provide the desired artificial chocolate flavor.

*Example 2*

Substantially the same mixture of ingredients and water as in Example 1 was lyophilized to drive off excess water after thorough mixture to the ingredients to yield a dry powder. The resulting powder was then reacted as in Example 1 in an oil bath at 130° C. for a period of 2 minutes. The resulting substantially an hydrous product has a lighter brown color than that of the product in Example 1 and when tested in the sugared milk of Example 1 provided a good chocolate flavor.

*Example 3*

The aqueous mixture of Example 1 when reacted at 130° C. for over 23 minutes yielded a burned or charred product having an off-flavor in the sugared milk solution. Admixture of a salt mix in the level of 20% by weight of the ingredients in Example 1 permitted reaction for periods in excess of an hour or more or at higher temperatures where desired without charring or otherwise burning the reaction product. Said salt mix comprised 50% sodium hexametaphosphate and 50% sodium acetate. A good chocolate flavor was obtained in the milk solution of Example 1, the substantially anhydrous reaction product having a brown color lighter than that in Example 1 and darker than Example 2.

*Example 4*

The same proportions of ingredients as in Example 1 were employed except that soy protein degraded to the extent of 15.6% with pepsin was reacted instead of the hydrolyzed casein. Under the reaction conditions of Example 1, the product was a light brown, friable, water-soluble substantially anhydrous material. A good chocolate flavor was obtained in the milk solution of Example 1 when the flavor product was dispersed therein.

*Example 5*

The same proportions of ingredients as in Example 1 were employed except that the protein hydrolyzate was wheat gluten degraded for 24 hours in 9 N sulfuric acid to a level of 42% hydrolysis. Under the reaction conditions of Example 1 the product was a brown, friable, water-soluble substantially anhydrous material. A good chocolate flavor was obtained in the milk solution of Example 1 when the flavor product was dispersed therein.

*Example 6*

The same proportions of ingredients as in Example 1 were employed except that the protein hydrolyzate was neutral gelatin degraded for 24 hours in 9 N sulfuric acid to a level of 52% hydrolysis. Under the reaction conditions of Example 1 the product was a brown, friable, water-soluble substantially anhydrous material. A good chocolate flavor was obtained in the milk solution of Example 1 when the flavor product was dispersed therein.

*Example 7*

740 gms. of enzymatically degraded soy protein (18.3% hydrolysis) and 55 gms. sodium hexametaphosphate were mixed with 170 gms. of dextrose and 170 gms. of caffein and dissolved in 2 gals. of hot water (71° C.). This batch was then spray-dried in a Western Precipitation Company Type N spray drier. This drier is approximately 8 ft. high and 3 ft. in diameter and is of a double cone type. The drying conditions are adjusted so as to achieve reaction in the drier. Air temperature at the inlet varies between 245° C. and 260° C., while the outlet temperature is from 115° C. to 150° C. An air flow rate through the drier of 160 cubic ft. per minute at standard conditions is used. The air pressure at the fluid nozzle was 200–225 lbs. per sq. in. (gauge) using a spray system pneumatic atomizing nozzle (¼ LN 1.0). The flavor product obtained was a brown water-soluble substantially anhydrous powder. A chocolate flavored milk drink was obtained by dissolving about 0.5 gm. of the flavor product in 100 ml. of milk containing 5 gms. of sucrose.

*Example 8*

100 lbs. of fluid skim milk were concentrated to approximately ⅓ of original volume and placed in a pasteurizer in which digestion was to be carried out. The concentrated skim milk was heated to 77° C. and held at that temperature for 10 minutes and then cooled to approximately 46° C. The pH of the batch was adjusted to a range of 8.0–8.2 with 10% sodium hydroxide. 15 gms. of Wilson's technical trypsin (80–1) previously dispersed in 1 lb. of cold water was added to the concentrated skim milk and the batch was digested at a temperature of approximately 46° C. At periodic intervals samples of the batch were analyzed to determine the ratio of amino nitrogen to total nitrogen. When the desired protein hydrolysis was achieved (8–55% and preferably 8–20% hydrolysis) the batch was heatd to 82.5° C. and held thereat for 20 minutes. This latter holding period tends to deactivate the enzyme as well as any microorganisms which may have been present in the milk. Thereafter the degraded skim milk was reacted in accordance with the technique set forth in Example 7, or it was pan roasted at about 125° C. for 8 minutes. Advantageously, this procedure employs as the reactants for producing the base flavor factor the naturally occurring reducing sugars present in the skim milk, primary, primary among which is lactose as well as the degraded milk protein. The base flavor factor obtained was a brown water-soluble substantially anhydrous powder. An artificial chocolate flavored milk drink was obtained by dissolving about 0.5 gm. of the base flavor factor together with 450–500 mg. of caffein in 100 ml. of milk containing 5 gms. of sucrose.

*Example 9*

100 lbs. of fluid skim milk was heated to 46° C. The pH of the batch was adjusted to 8.5 with 10% sodium hydroxide. 15 gms. of Wilson's technical trypsin (80–1) previously dispersed in 1 lb. of cold water was then added to the heated batch. The batch is degraded for periods ranging from 20 to 120 minutes and pH is maintained substantially above 7.0. The milk protein is hydrolyzed 8–20%. Thereafter the batch was heated to 82.5° C. and held at that temperature for at least 20 minutes to deactivate the enzyme as well as any microorganisms which may have been present in the milk. Thereafter the degraded skim milk was reacted in accordance with the conditions set forth in Example 8 and produced a water-soluble, highly flavorful brown substantially anhydrous powder-like base flavor factor. A chocolate flavored milk drink was obtained by dissolving about 0.5 gm. of the base flavor factor together with 450–500 mg. of caffein in 100 ml. of milk containing 5 gms. of sucrose.

*Example 10*

An alternative procedure to that employed in Example 8, and using casein as the source of protein involved hydrolysis of the casein in substantially the same equipment as in Example 8. In this case about 71 lbs. of water were added to the pasteurizer in which digestion was to be carried out. Thereafter 6 lbs. of 10% sodium hydroxide solution was added and the mixture was heated to 63° C. and held thereat. While agitating the solution, 20 lbs. of casein was slowly added in successive portions, the ingredients of each portion being allowed to swell before addition of the next portion to prevent protein lumping. After all the casein was added, agitation was continued at around 64° C. for 10 minutes to insure solubilization of the protein. The pH of the solution was then adjusted to 8.0–8.2 using a 10% sodium hydroxide solution. The batch was then cooled to 46° C. as before and 85 gms. of Wilson's technical trypsin (80–1) previously dispersed in 3 lbs. of cold water was added to the solution. The batch was then digested at an approximate temperature of 46° C., the preferred percent hydrolysis being 30–55%. Thereafter the batch was heated to 82° C. and held thereat for 20 minutes to deactivate the enzymes therein. Finally the batch was dried and the degraded casein reacted with the materials and in the manner employed with the hydrolyzed soy protein as in Example 7 to yield the desired substantially anhydrous flavor product.

*Example 11*

The procedure of Example 10 was repeated employing soy protein in the place of casein, the degree of enzymatic hydrolysis being only 15% in the case of the soy protein. The hydrolyzed soy protein was then reacted with the materials and in the same manner employed with the hydrolyzed soy protein of Example 7 to yield a substantially anhydrous highly desirable water soluble artificial chocolate flavor.

*Example 12*

900 lbs. of skim milk powder is dissolved in water at 25° C. at concentrations ranging from 8–35%, preferably 20–30% solids. The reconstituted skim milk is hydrolyzed for 20–60 minutes using Wilson's technical trypsin (80–1) at a level of 0.6% by weight of the total milk solids in a 4,000 gal. stainless steel holding tank at a temperature of 45°–47° C. The thus treated skim milk solution is then drip fed into the trough formed by a pair of steam heated drying rolls 90 inches long and 42 inches outside diameter set about 1/16 inch apart so that said solution is removed as a thin layer by the rolls rotating downwardly from the point of near contact. The rolls were heated with steam at an equilibruim steam pressure of 80–100 p. s. i. (gauge), the rolls being driven at about 6 R. P. M. The reaction product is removed from the rolls by doctor blades located about two-thirds of the way around from the point of near contact. Skim milk degraded for periods in excess of one hour tends to impair subsequent drum drying efficiency in that, after reaction, the base flavor factor removed from the rolls is tacky or gummy and thus difficult to handle, although flavor was produced in such reaction products. The reaction product removed from the rolls had a temperature of about 95° C. as measured by a thermometer inserted into the sheet-like material as it was collected on the doctor blade for each roll indicating reaction effected at higher temperatures; the reaction mixture in the pinch between the rolls had a temperature in the order of 125° C. The sheet-like material may be subjected to a draft of cooling air to lower the temperature thereof below its melting point and facilitate removal of the base flavor factor by the doctor blades. The base flavor factor produced was a crisp, friable, tan, sheet-like, substantially anhydrous material. Generally, as the concentration of solids in the feed liquor is increased over 10% a thicker sheet can be removed from the rolls thereby increasing capacity. A solids concentration of about 25–30%, and a period of hydrolysis in the neighborhood of 20 minutes, are the preferred conditions employing such drum drying equipment. The reaction product was light brown in color, had a moisture content of less than 5%, was water-soluble, and was produced at a rate of about 240 pounds per hour.

*Example 13*

Liquid skim milk having a milk solids concentration of about 8.5% was adjusted to pH 8.5 with sodium hydroxide and degraded at a temperature of about 46° C. for 20–30 minutes using 0.6% Wilson's technical trypsin based on the weight of the milk solids. The partially degraded skim milk was then reacted by drum drying according to the conditions in Example 12, the drying rolls being driven at 6 R. P. M. The base flavor factor has the same characteristics as those produced in Example 12.

*Example 14*

An artificial chocolate flavor for use in a coating or a chocolate bar was prepared from the base flavor factor in Example 12. 0.5–5.0 parts of the base flavor factor was employed in a mix including 40–45 parts sucrose, 15–20 parts toasted cottonseed flour as a filler and a coloring agent, 0.1–0.6 part alpha-glucose penta-acetate or 0.03–0.2 part beta-glucose penta-acetate for bitterness, 0.5–3.0 parts catechu gum for astringency, and 30–40 parts by weight cocoa butter or other hard fat together with minor portions of other flavoring agents such as vanillin, ethyl vanillin, and sodium chloride, as well as color. A typical mix is as follows:

| | Parts by weight |
|---|---|
| Coating sugar | 43.75 |
| Cottonseed flour | 18.25 |
| Alpha-glucose penta-acetate | .20 |
| Sodium chloride | .05 |
| Base flavor factor | 1.00 |
| Catechu gum | 1.00 |
| Cocoa butter | 23.20 |

This mix was blended in a mixer and then put through cocoa rolls to "finish" the blended ingredients. Thereafter the finished mix was emulsified for a number of hours at an elevated temperature during which 11.5 parts cocoa butter, 0.03 part ethyl vanillin and 1.0 part lecithin were added. The resulting product was then tempered, poured into molds and cooled to hardness.

*Example 15*

A milk drink employing the base flavor factor of Example 12 was prepared by mixing 85.20 parts sugar, 0.73 part caffein, 3.65 parts catechu gum, 0.06 part sodium chloride, 3.65 parts base flavor factor, and 0.3 part by weight ethyl vanillin. Then 8.2 gms. of the mix were dissolved in 100 ml. of milk to provide a milk drink which can be consumed either hot or cold.

*Example 16*

A mix for a chocolate flavored fudge employing the base flavor factor of Example 12 is as follows:

89.66 parts of sugar
0.01 part sodium chloride
6.73 parts butter
1.67 parts base flavor factor
0.45 part caffein
1.35 parts catechu gum
0.005 part ethyl vanillin 446 gms. of this mix and coloring agents together with one cup of milk was simmered in a saucepan, poured into a flat tray, and cooled to produce the fudge product.

*Example 17*

A chocolate flavored frozen sherbet was prepared including the base flavor factor of Example 12 by mixing 38.86 parts sucrose
8.83 parts dextrose
47.70 parts dry corn syrup
2.65 parts base flavor factor
0.09 part sodium chloride
0.53 part caffein
1.33 parts catechu gum
0.0022 part ethyl vanillin 113 gms. of this mix was blended with one cup (236 ml.) of milk and then chilled. Thereafter the chilled product was whipped and further chilled into the form of a frozen sherbet or similar confectionery product.

*Example 18*

The base flavor factor of the present invention may be employed in the enhancement of natural chocolate products such as coatings using, for example, the following procedure. 32 lbs. of chocolate liquor, 15 lbs. of cocoa butter, 45 lbs. of coating sugar, 3.5 lbs. of skim milk powder, and 2 lbs. of the base flavor factor of the present invention as provided, for example, by the process of Example 12, are mixed in a regular chocolate blender heated at a temperature of 120° F., said mixing requiring about 20 minutes. On the other hand, a melangeur may be employed in place of the aforementioned blender. The blended material is then ground in a 5-roll grinder or refiner, and the liquor is then conged for about 36 hours after which additional cocoa butter is added to reduce viscosity if desired.

*Example 19*

The base flavor factor of the present invention as provided, for example, in accordance with the procedure of Example 12 may also be employed in an artificial chocolate coating containing cocoa powder and a specially processed coconut oil in place of cocoa butter. Said modified coconut oil is a so-called "hard butter" resulting from hydrogenation and/or fractionation. Coatings are prepared by first preparing the following two blends in accordance with the procedure set forth in Example 19, Coating 1:

| | Lbs. |
|---|---|
| Base flavor factor | 8.00 |
| Skim milk solids | 6.00 |
| Dried corn syrup solids | 5.00 |
| Sucrose | 47.50 |
| Hard butter | 32.00 |
| Emulsifier | 1.5 |
| | 100.00 |

Coating 2:

| | |
|---|---|
| Low-fat cocoa | 24.00 |
| Sucrose | 45.50 |
| Hard butter | 28.00 |
| Emulsifier | 2.5 |
| | 100.00 |

In addition to using the two coatings set forth above as such, they may also be blended, for example, by combining them in the ratio of 3 parts of coating 2 to 1 part of coating 1.

It will be understood that while the invention has been described in part by means of specific examples reference should be had to the appended claims for a definition of the scope of the invention.

What is claimed is:

1. A process for producing a chocolate base flavor factor comprising reacting a partially hydrolyzed protein with a saccharide by the application of heat to a mixture of the reagents at a temperature and for a time sufficient to produce said base flavor factor in a substantially anhydrous condition at least at the end of the reaction, the reaction being carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide.

2. The process of claim 1 in which the protein is hydrolyzed to 8–70%.

3. The process of claim 1 in which the reducing saccharide is a pentose and the reaction is carried out at a temperature within the range of 90°–130° C.

4. The process of claim 1 in which the reducing saccharide is a polysaccharide and the reaction is carried out at a temperature within the range of 120°–150° C.

5. The process of claim 1 in which the reducing saccharide is a non-reducing polysaccharide which is a precursor of a reducing saccharide formed under the conditions of the reaction and the reaction is carried out at a temperature within the range of 140°–170° C.

6. The process of claim 1 in which the protein is milk protein.

7. The process of claim 1 in which the protein is casein.

8. The process of claim 1 in which the protein is a cereal protein.

9. The process of claim 1 in which the protein is soy protein.

10. The process of claim 1 in which the protein is wheat gluten.

11. The process of claim 1 in which the protein is gelatin.

12. The process of claim 1 in which the protein is milk protein and the reducing sugar is lactose.

13. An artificial chocolate flavor which comprises in combination the base flavor factor of claim 1 and a bitterness flavor factor.

14. An artificial chocolate flavor which comprises in combination the base flavor factor of claim 1 and a bitter polyacetate of a polyhydric compound selected from the group consisting of sugars and polyhydric alcohols.

15. An artificial chocolate flavor which comprises in combination the base flavor factor of claim 1 and a bitter alkaloid.

16. An artificial chocolate flavor which comprises in combination the base flavor factor of claim 1 and a bitter glucoside.

17. An artificial chocolate flavor which comprises in combination the base flavor factor of claim 1 and an astringent flavor factor.

18. An artificial chocolate flavor which comprises in combination the base flavor factor of claim 1 and an astringent flavor factor selected from the group consisting of tannins and tannates.

19. An artificial chocolate flavor which comprises in combination the base flavor factor of claim 1 and an alum.

20. An artificial chocolate flavor which comprises in combination the base flavor factor of claim 1, a bitterness flavor factor, and an astringent flavor factor.

21. An artificial chocolate flavor which comprises in combination the base flavor factor of claim 1, a bitterness flavor factor, and natural chocolate aroma.

22. An artificial chocolate flavor which comprises in combination the base flavor factor of claim 1, a bitterness flavor factor, and artificial chocolate aroma.

23. An artificial chocolate flavor which comprises in combination the base flavor factor of claim 1, a bitter polyacetate of a polyhydric compound selected from the group consisting of sugars and polyhydric alcohols, and an astringent flavor factor selected from the group consisting of tannins and tannates.

24. An enhanced chocolate flavored material which comprises in combination the base flavor factor of claim 1 and a natural chocolate flavored material.

25. A cacao material of enhanced chocolate flavor which comprises in combination the base flavor factor of claim 1 and cocoa powder.

26. A cacao material of enhanced chocolate flavor which comprises in combination the base flavor factor of claim 1 and cocoa butter.

27. A cacao material of enhanced chocolate flavor which comprises in combination the base flavor factor of claim 1, cocoa butter and cocoa powder.

28. A cacao material of enhanced chocolate flavor which comprises in combination the base flavor factor of claim 1 and chocolate liquor.

29. A cacao material of enhanced chocolate flavor which comprises in combination the base flavor factor of claim 1 and milk chocolate.

30. A cacao material of enhanced chocolate flavor which comprises in combination the base flavor factor of claim 1 and sweet chocolate.

31. A process for producing a chocolate base flavor factor comprising reacting an oligopeptide with a saccharide by the application of heat to a mixture of the reagents at a temperature and for a time sufficient to produce said base flavor in a substantially anhydrous condition at least at the end of the reaction, the reaction being carried out at a temperature of 90°–130° C. where the saccharide is a pentose; 120°–150° C. where the saccharide is selected from the group of hexoses and reducing polysaccharides; and 140°–170° C. where the saccharide is a nonreducing polysaccharide which is a precursor of a reducing saccharide.

32. The process of claim 31 in which the reducing saccharide is a pentose and the reaction is carried out at a temperature within the range of 90°–130° C.

33. The process of claim 31 in which the reducing saccharide is a polysaccharide and the reaction is carried out at a temperature within the range of 120°–150° C.

34. The process of claim 31 in which the reducing saccharide is a non-reducing polysaccharide which is a precursor of a reducing saccharide formed under the conditions of the reaction and the reaction is carried out at a temperature within the range of 140°–170° C.

35. A process for producing a chocolate base flavor factor comprising reacting a partially hydrolyzed protein with a saccharide in the presence of an amino acid selected from the group consisting of alpha-amino-n-butyric acid, histidine, alanine, arginine, aspartic acid, glycine, glutamic acid, valine, phenylalanine, proline, lysine, iso-leucine, leucine, threonine, tyrosine, and tryptophane by the application of heat to a mixture of the reagents at a temperature and for a time sufficient to produce said base flavor factor in a substantially anhydrous condition at least at the end of the reaction, the reaction being carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide.

36. The process of claim 35 in which the amino acid is phenylalanine.

37. The process of claim 35 in which the amino acid is threonine.

38. A process for producing a chocolate base flavor factor comprising reacting an oligopeptide with a saccharide in the presence of an amino acid selected from the group consisting of alpha-amino-n-butyric acid, histidine, alanine, arginine, aspartic acid, glycine, glutamic acid, valine, phenylalanine, proline, lysine, iso-leucine, leucine, threonine, tyrosine, and tryptophane, by the application of heat to a mixture of the reagents, at a temperature and for a time sufficient to produce said base flavor factor in a substantially anhydrous condition at least at the end of the reaction, the reaction being carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide.

39. The process of claim 38 in which the amino acid is phenylalanine.

40. The process of claim 38 in which the amino acid is threonine.

41. An artificial chocolate flavor which comprises in combination the base flavor factor of claim 1, an artificial chocolate aroma and an astringency flavor factor.

42. An artificial chocolate flavor which comprises in combination the base flavor factor of claim 1, an artificial chocolate aroma, an astringency flavor factor and a bitterness flavor factor.

43. A process for producing a chololate base flavor factor which comprises reacting at approximately 120°–150° C. a substantially anhydrous reaction mixture of milk protein hydrolyzed 8–55% and a reducing sugar selected from the group consisting of hexoses and reducing polysaccharides.

44. A process for producing a chocolate base flavor factor from a milk product containing milk protein and milk sugar which comprises hydrolyzing the milk protein 8–55%, and reacting a substantially anhydrous mixture of said hydrolyzed milk protein and said milk sugar at a temperature of approximately 120°–150° C., to develop the chocolate base flavor factor.

45. A process for producing a chocolate base flavor factor from a milk product containing milk protein and milk sugar which comprises hydrolyzing the milk protein 8–55%, then dehydrating the product until it is substantially anhydrous, and reacting the hydrolyzed milk protein with the milk sugar in the dehydrated product at a temperature of approximately 120°–150° C. to develop the chocolate base flavor factor.

46. A process for producing a chocolate base flavor factor from a milk product containing milk protein and milk sugar which comprises enzymatically hydrolyzing the milk protein 8–20%, and reacting a substantially anhydrous mixture of said hydrolyzed milk protein and said milk sugar at a temperature of approximately 120°–150° C. to develop the chocolate base flavor factor.

47. The process of claim 46 in which the milk protein is hydrolyzed with trypsin.

48. A process for producing a chocolate base flavor factor from a milk product containing milk protein and milk sugar which comprises enzymatically hydrolyzing the milk protein 8–55%, and reacting a substantially anhydrous mixture of said hydrolyzed milk protein and said milk sugar at a temperature of approximately 120°–150° C., to develop the chocolate base flavor factor.

49. A process for producing a chocolate base flavor factor comprising reacting a partially hydrolyzed protein with a saccharide by the application of heat to a mixture of the reagents at a temperature and for a time sufficient to produce said base flavor factor in a substantially anhydrous condition at least at the end of the reaction, the reaction mixture having an alkaloid present therein; the reaction being carried out at a temperature of 90°–130° C. where the saccharide is a pentose; 120°–150° C. where the saccharide is selected from the group consisting of hexoses and reducing polysaccharides; and 140°–170° C. where the saccharide is a non-reducing polysaccharide which is a precursor of a reducing saccharide.

50. A process for producing a chocolate base flavor factor comprising reacting a partially hydrolyzed protein with a saccharide by the application of heat to a mixture of the reagents at a temperature and for a time sufficient to produce said base flavor factor in a substantially anhydrous condition at least at the end of the reaction, the reaction mixture having tannins present therein; the reaction being carried out at a temperature of 90°–130° C. where the saccharide is a pentose; 120°–150° C. where the saccharide is selected from the group consisting of hexoses and reducing polysaccharides; and 140°–170° C. where the saccharide is a non-reducing polysaccharide which is a precursor of a reducing saccharide.

51. A process for producing a chocolate base flavor factor comprising reacting a partially hydrolyzed protein with a saccharide by the application of heat to a mixture of the reagents at a temperature and for a time sufficient to produce said base flavor factor in a substantially anhydrous condition at least at the end of the reaction, the reaction mixture having tannins and an alkaloid present therein; the reaction being carried out a temperature of 90°–130° C. where the saccharide is a pentose; 120°–150° C. where the saccharide is selected from the group consisting of hexoses and reducing polysaccharides; and 140°–170° C. where the saccharide is a non-reducing polysaccharide which is a precursor of a reducing saccharide.

References Cited in the file of this patent

UNITED STATES PATENTS

| 2,103,495 | Ruckdeschel | Dec. 28, 1937 |
| 2,364,008 | Stuart | Nov. 28, 1944 |
| 2,414,299 | Hall | Jan. 14, 1947 |
| 2,590,646 | Pettibone | Mar. 25, 1952 |

FOREIGN PATENTS

| 107,367 | Great Britain | Mar. 18, 1918 |

OTHER REFERENCES

"The Chemical Senses," by Moncrieff, Leonard Hill Limited, 17 Stratford Place, WI, London, 1944, pages 109, 110, 196 and 239.

"The Chemistry and Technology of Food and Food Products," by Jacobs, second edition, Interscience Publishers, Inc., New York, 1951, page 1649.